(12) United States Patent
Maier et al.

(10) Patent No.: US 10,740,488 B2
(45) Date of Patent: *Aug. 11, 2020

(54) COGNITIVE DATA ANONYMIZATION

(71) Applicant: INTERNATIONAL BUSINESS MACHINES CORPORATION, Armonk, NY (US)

(72) Inventors: Albert Maier, Tuebingen (DE); Martin Oberhofer, Bondorf (DE); Yannick Saillet, Stuttgart (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 34 days.

This patent is subject to a terminal disclaimer.

(21) Appl. No.: 15/815,743

(22) Filed: Nov. 17, 2017

(65) Prior Publication Data

US 2019/0156060 A1    May 23, 2019

(51) Int. Cl.
*G06F 21/62* (2013.01)
*G06N 20/00* (2019.01)

(52) U.S. Cl.
CPC ......... *G06F 21/6254* (2013.01); *G06N 20/00* (2019.01); *G06F 2221/2113* (2013.01)

(58) Field of Classification Search
CPC .................. G06F 21/6254; H04L 2209/42
See application file for complete search history.

(56) References Cited

U.S. PATENT DOCUMENTS

| 5,881,225 A * | 3/1999 | Worth ............... G06F 21/62 713/164 |
| 7,269,578 B2 | 9/2007 | Sweeney |
| 2012/0233129 A1 | 9/2012 | Brinkmoeller et al. |
| 2012/0259877 A1 | 10/2012 | Raghunathan et al. |
| 2015/0186674 A1* | 7/2015 | Vyas .................. G06F 21/6254 726/26 |
| 2017/0124335 A1 | 5/2017 | Freudiger et al. |

FOREIGN PATENT DOCUMENTS

| CN | 103931222 A | 7/2014 |
| CN | 104080081 A | 10/2014 |

(Continued)

OTHER PUBLICATIONS

IBM "List of IBM Patents or Patent Applications Treated as Related"; Date Filed: Apr. 23, 2019, 2 pages.

(Continued)

*Primary Examiner* — Paul E Callahan
(74) *Attorney, Agent, or Firm* — Cantor Colburn LLP; Reza Sarbakhsh

(57) ABSTRACT

A computer implemented method for data anonymization comprises: receiving a request for data that needs anonymization. The request comprises at least one field descriptor of data to be retrieved and a usage scenario of a user for the requested data. Then, based on the usage scenario, an anonymization algorithm to be applied to the data that is referred to by the field descriptor is determined. Subsequently, the determined anonymization algorithm is applied to the data that is referred to by the field descriptor. A testing is performed, as to whether the degree of anonymization fulfills a requirement that is related to the usage scenario. In the case, the requirement is fulfilled, access to the anonymized data is provided.

18 Claims, 5 Drawing Sheets

(56) References Cited

FOREIGN PATENT DOCUMENTS

| | | |
|---|---|---|
| CN | 105874768 A | 8/2016 |
| CN | 107004019 A | 8/2017 |
| EP | 2228735 A2 | 11/2010 |
| WO | 0051365 | 8/2000 |
| WO | 2014144404 A1 | 9/2014 |

OTHER PUBLICATIONS

Maier, Albert et al., "Cognitive Data Anonymization" U.S. Appl. No. 16/391,354, filed Apr. 23, 2019.

Fredj, Feten Ben et al., "Abstracting Anonymization Techniques: A Prerequisite for Selecting a Generalization Algorithm", ScienceDirect; Procedia Computer Science 60; 2015; pp. 206-215.

Kaur, Arshveer, Abstract Only "A hybrid approach of privacy preserving data mining using suppression and perturbation techniques", date of conference: Feb. 21-23, 2017; Date added to IEEE: Jul. 13, 2017, http://ieeexplore.ieee.org/document/7975625/; 3 pgs.

Usha, P. et al. Abstract Only "Sensitive attribute based non-homogeneous anonymization for privacy preserving data mining", Date of Conference Feb. 27-28, 2014; Added to IEEE Xplore: Feb. 9, 2015; downloaded on Feb. 9, 2017; http://ieeexplore.ieee.org/document/7033934/; 2 pgs.

Emory University "Lectures, Readings, and Assignments" http://www.mathcs.emory.edu/~lxiong/cs573_s12/schedule.html; 3 pgs.

European Union "Home Page of EU EDPR—General Data Protection Regulation", http://www.eugdpr.org/; 1 pg.

International Search Report and Written Opinion for Application No. PCT/IB2018/058229; dated Feb. 15, 2019; 10 pgs.

\* cited by examiner

| Name | Date | Sex | Nationality | Address | Disease |
|---|---|---|---|---|---|
| Andre Miller | 21/1/79 | male | German | 72070 | Asian Flu |
| Bert Smith | 18/02/79 | male | US | 72072 | Hepatitis B |
| Beth Smith | 10/1/81 | female | French | 72074 | Hepatitis A |
| Carol Care | 1/10/81 | female | Italian | 72070 | Russian Flu |
| Dan Muller | 21/2/80 | male | French | 70173 | Hepatitis B |
| Ellen Gatsby | 19/4/79 | male | Italian | 70176 | Asian Flu |

Fig. 4

| Date | Sex | Nationality | Address | Disease |
|---|---|---|---|---|
| [79-81] | male | A1 | Tuebingen | Flu |
| [79-81] | male | A4 | Tuebingen | Hepatitis |
| [79-81] | female | A2 | Tuebingen | Hepatitis |
| [79-81] | female | A3 | Tuebingen | Flu |
| [79-81] | male | A2 | Stuttgart | Hepatitis |
| [79-81] | male | A3 | Stuttgart | Flu |

400

COGNITIVE DATA ANONYMIZATION

BACKGROUND

The present invention relates to the field of data anonymization, and more particularly relates to a method, a computer program product, and a system of Information Governance and Data Privacy Protection.

Privacy regulations like GDPR (http://www.eugdpr.org/) focus on protecting individuals against certain usage of their data. It is not in correspondence with law to use the individual's data for certain kind of analytics unless they explicitly declared their consent with that usage. On the other hand, it may be acceptable to collect and store personal data and it may also be acceptable to use it in analytics as long as the data is "sufficiently anonymized", e.g. GDPR phrases "If the data processed by a controller do not permit the controller to identify a person, they are not required to gain additional information for the purposes of complying with this regulation."

As an example: It may be assumed that a data scientist wants to investigate a table with the results of a medical study to find new relationships between regions and certain kind of diseases. Certainly, the data scientist should not be allowed to identify concrete individuals and to see their sensitive personal information. Fortunately, in this example, identifying columns like "Name" are not necessary for the investigation, or quasi-identifying columns like "Hobbies" could likely get masked without impairing the investigation. So these columns are easy to deal with.

In contrast, the investigation would be impossible if other quasi-identifying columns like address or the disease information were fully encrypted or masked or redacted. On the other hand, not anonymizing such columns typically leads to easy identification of individuals as there might be diseases and/or addresses that are too unique. For such cases anonymizing by generalization can help, e.g. generalizing concrete addresses to cities or generalizing very detailed disease information like "Asian Flu" to more general information like "Flu". Such generalizations often do not hurt the investigation, but could help to sufficiently anonymize data so that individuals cannot be tracked down.

SUMMARY

Various embodiments provide for a computer implemented method for data anonymization, a computer program product for data anonymization, and a system for data anonymization in the independent claims. Advantageous embodiments are described in the dependent claims. Embodiments of the present invention can be freely combined with each other if they are not mutually exclusive.

In one aspect, the invention relates to a computer implemented method for data anonymization, comprising: receiving a request for data, the request comprising at least one field descriptor of data to be retrieved and a usage scenario of a user for the requested data; determining, based on the usage scenario, an anonymization algorithm to be applied to the data that is referred to by the field descriptor; applying the determined anonymization algorithm to the data that is referred to by the field descriptor; testing, whether the degree of anonymization fulfills a requirement that is related to the usage scenario; in the case, the requirement is fulfilled, providing access to the anonymized data.

In another aspect, the invention relates to a computer program product for anonymizing data, the computer program comprising: a computer readable storage medium having computer usable code embodied therewith, wherein the computer readable storage medium is not a transitory signal per se, the computer usable program code comprising: computer usable code configured for receiving a request for data, the request comprising at least one field descriptor of data to be retrieved and a usage scenario of a user for the requested data; computer usable code configured for determining, based on the usage scenario, an anonymization algorithm to be applied to the data that is referred to by the field descriptor; computer usable code configured for applying the determined anonymization algorithm to the data that is referred to by the field descriptor; computer usable code configured for testing, whether the degree of anonymization fulfills a requirement that is related to the usage scenario; computer usable code configured for, in the case, the requirement is fulfilled, providing access to the anonymized data.

In another aspect, the invention relates to a system for anonymizing data, the system comprising: a communication component configured to communicate with a user; an anonymization engine, communicatively coupled to the communication component, the anonymization engine comprising a means for receiving a request for data, the request comprising at least one field descriptor of data to be retrieved and a usage scenario of a user for the requested data; a means for determining, based on the usage scenario, an anonymization algorithm to be applied to the data that is referred to by the field descriptor; a means for applying the determined anonymization algorithm to the data that is referred to by the field descriptor; a means for testing, whether the degree of anonymization fulfills a requirement that is related to the usage scenario; a means for, in the case, the requirement is fulfilled, providing access to the anonymized data.

BRIEF DESCRIPTION OF THE DRAWINGS

In the following

FIG. 4 exemplarily illustrates a table to be anonymized; and

DETAILED DESCRIPTION

Figure 1:
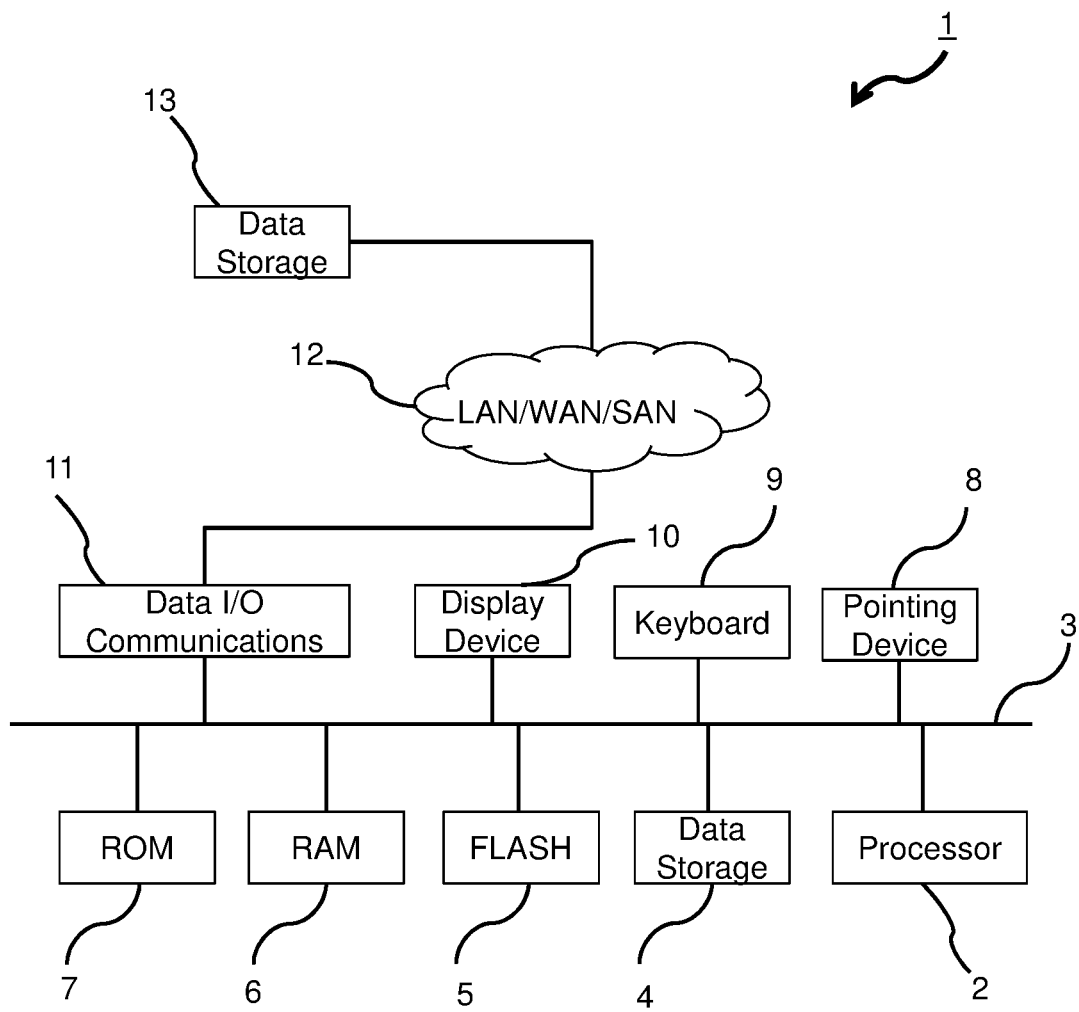
FIG. 1 illustrates an example computer processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method as described below may provide data anonymization, in particular data anonymization with the purpose of data privacy protection. This may have a benefit that personally identifiable information within data sets of interest may be modified in a way, that information that would be able to identify a single person is omitted while, at the same time, information that is useful for analysis, may be maintained.

The method may further include receiving a request for data, the request comprising at least one field descriptor of data to be retrieved and a usage scenario of a user for the requested data. A skilled person will understand that the step of receiving may indicate receiving from an application, wherein the application may be provided with an interface to a user, e.g., a graphical user interface. "Field descriptor" as used herein, in particular may mean a column name of data to be retrieved. For example, the field descriptor may be "name" or "disease". A usage scenario may specify the circumstances under which the request is issued. For example, a usage scenario may include the purpose, also denoted as "intent", with which the request is issued, as for example a medical study evaluation. Further, the usage scenario may include the role of the user, as for, e.g., data analyst or end user. The data analyst might, for example, have an extended right to directly support machine learning by specific teach-in.

It is to be noted that the data may have different grades of requirements of privacy. For example, a name, associated with a database column "name", would be able to directly identify a person—thus, the column "name" is denoted as an "identifying column", whereas a column, e.g., "hobby" might only be "quasi-identifying" because only in conjunction with other information, a person might be identifiable. Finally, information might be denoted as "sensitive", such as a data column "disease".

The method may further include determining, based on the usage scenario, an anonymization algorithm to be applied to the data that is referred to by the field descriptor. In particular, in the case data specified by multiple columns is requested, the data of identifying columns and quasi-identifying columns should be anonymized. It is desirable that, e.g. in a medical study, that columns that are able to identify a person will be completely anonymized, whereas quasi-identifying information may be completely anonymized or at least generalized to a high degree, and, finally, the really interesting information, as for e.g. disease in the case of the medical study, is not anonymized or slightly generalized. This may have an advantage that a search result may be presented to the user, wherein the search result is tuned to be of a high usefulness concerning the intent of the search, while, at the same time, obeying to law concerning data privacy.

The method may further include relating the usage scenario for the requested data and the protection levels related to the field descriptors of the requested data. This may have an advantage in that according to the usage scenario, fields of different data columns might be anonymized by executing different anonymization algorithms, while still obeying requirements concerning privacy.

For example, if a disease is to be correlated to a location, the names and the hobbies and the gender might be completely suppressed. On the other hand, if the intent includes a question directed to a correlation between disease and hobby, the address column might be completely compressed, only remaining the data of the columns disease and hobby unaltered or, at maximum, slightly generalized. In this context, "slightly generalized" may mean, e.g., that any kind of flu, e.g. "Asian flu" or "stomach flu", would be referred to as "flu", and, e.g., any kind of cancer would be anonymized to read "cancer" only. More severely generalized, all data values in the column "disease" might be modified to be only one of the two values of, e.g., "μl" or "not-ill".

The method may further include, based on the usage scenario and the protection levels, determining an anonymization algorithm for each of the field descriptors. This may have an advantage of optimally providing useful and rich data for analysis while obeying data privacy laws.

The method may further include applying the determined anonymization algorithm to the data that is referred to by the field descriptor. This may have an advantage that user, the data scientist or the end user only receives data that he is allowed to see and that he might possibly be allowed to publish. The skilled person will understand that the anonymization will not be applied to the original data, however it will preferably be applied to a copy of the data. Thus, the original data may be maintained for a later search under a different intent requiring different anonymization algorithms for each of the data fields requested.

The method may further include testing, whether the degree of anonymization fulfills a requirement that is related to the usage scenario. This may have an advantage in that the result that is presented to the user always will comply with data privacy law.

The method may further include, in the case, the requirement is fulfilled, providing access to the anonymized data. In other words, if the search result does not comply with data privacy law, the search result will not be presented to the user. The user will only get the information, that, under taking into account his very intent, his role, and the considered and/or selected anonymization algorithms, a result is achieved, that would not obey data privacy law, and, thus, may not be shown.

The parameters that have caused the search result that was anonymized due to the actual requirements, may be stored and be used as a feedback for machine learning to improve the working of the overall algorithm. For example, the parameters, as for, e.g., intent, user role, selected anonymization algorithms, given data privacy governance, might be fed back, so that, next time a user issues a similar search request, a successful strategy will be prompted and suggested to the user on a high-ranked position, whereas, a strategy that has caused the search result to be not allowable to be presented due to data privacy law, would not be suggested or only on a low-ranked position.

As meant herein, the term "data privacy law" shall denote data privacy law, as well as any data privacy governance or data privacy policy.

The method may further include determining, based on the usage scenario, a protection level related to the field descriptor of the requested data. For example, in a usage scenario related to a medical analysis, the field descriptor or column "name" might be related to a highest possible protection level, because this column carries identifying data, or may be referred to as identifying column, whereas the column "hobby" might be related to a lower protection level. A skilled person will understand that a high protection level or a high privacy level may be specified in a set of data privacy governance rules. This may have an advantage that, during an interactive process initiated by a user, within the protection level, several anonymization algorithms might be flexibly tested, in order to finally receive a result with optimal and rich information content and, at the same time, obeying data privacy law.

According to one embodiment, the method may include that the usage scenario includes an intent of the user requesting the data and a role of the user. This may have an advantage in that several of the circumstances of the search or analysis may be taken into account, in order to flexibly achieve a result having useful data content and only data lawfully allowed to be presented.

According to one embodiment, the method may include that at least one protection level is associated with the field descriptor. In other words, a field descriptor may be associated with multiple protection levels. Thus, an even more flexible way of associating an anonymization algorithm might be achieved.

According to one embodiment, the method may include that the anonymization algorithm to be applied is selected based on the usage scenario and the protection level.

According to one embodiment, the method may include that the anonymization algorithm is at least one of the following: generalization, redaction, suppressing, sampling, randomization, data swapping, masking, enumeration. Essentially, the anonymization algorithms are known in the art. It is to be understood that, e.g., generalization may be achieved by the cooperation of a catalog comprising, e.g. a relation of business terms and data column names, with an artificial intelligence program. The list of anonymization algorithms may be extended by the user.

According to one embodiment, the method may include receiving a feedback from a user, the feedback forming a support of machine learning. The feedback from the user might include an information with a meaning of, e.g., "I am satisfied with the result." or "I am not satisfied with the result." In the case, the user is not satisfied with the result, though it is presented to him under obeying data privacy law, the learning algorithm might store this valuation as "data content not sufficient" and try to find anonymization algorithms that are less restrictive and, further, for the next time a user issues a similar request having a similar intent, apply these less restrictive anonymization algorithms. This may have an advantage that the execution of the method until a satisfying search result is achieved might be completed within shorter time.

According to one embodiment, the method may include that the requirement that is related to the usage scenario is k-anonymity. A skilled person will understand that a criterion is necessary for checking, whether the search result is sufficient anonymized, so that it is not possible to identify any of the persons, the data of which is presented according the usage scenario. This may have an advantage that it is secured that the data fulfills a requirement concerning anonymity, in order to obey data privacy law. "k-anonymity" as used herein may mean: A table is k-anonymized, if for each record representing an individual there are at least additional k−1 individuals whose information also appear in the table and the data is not distinguishable, i.e., the governance rule demands at least one duplicate per individual with respect to columns that can be used to identify individuals.

According to one embodiment, the method may include that the data is related to information asset metadata that includes an availability of data tables to the user and the field descriptors these data tables have.

According to one embodiment, the method may include that business terms are provided, forming keywords to be used by the user, wherein classification information is provided, representing relationships between business terms and information asset metadata.

The classification information may be represented via relationships between information assets and business terms, e.g. a table "Medical Research Study 1" might have a column "DOB" that is classified with the business term "Date of Birth". Other classification examples are that a column "Date" might be classified as "Contract Date" or a column "Risk" might be classified as "Involved Party Risk Exposure". Basically the classifications may be able to describe the semantic nature of data, i.e., the "business meaning". For the purpose of describing this disclosure it is considered that every information asset has exactly one classification. It is straightforward to extend the method to systems where no and/or multiple classifications can occur.

According to one embodiment, the method may include that generalization hierarchies are provided for enabling a generalization algorithm to execute. This may have an advantage in that it may allow access to information like, e.g., which cities can be generalized to which counties, which counties to which states, which states to which country or information that an "Asian Flu" can be generalized to "Flu" which can be generalized to "Infectious Disease".

According to one embodiment, the method may include that a data privacy governance rule and a corresponding test algorithm for the testing, is specified, for controlling the method to be executed until, based on the data to be retrieved and the usage scenario, the retrieved data after anonymization corresponds to the required degree of anonymization. It is to be understood that the scope of testing may be associated with a decision as to whether the degree of anonymization fulfills the requirement that is related to the usage scenario.

As an example a rule could specify "if a user has role A and a table contains columns that are flagged in the catalog as being sensitive personally identifiable information and the table also contains columns flagged as identifiers or quasi-identifiers. then the data needs to be k-anonymized with k>=10". A corresponding algorithm to check whether data is 10-anonymized is straightforward and known to the skilled person.

According to one embodiment, the method may include that a model is provided, the model specifying a relationship between an anonymization algorithm, a usage scenario, and a classification of the data.

According to one embodiment, the method may include that the model is built up by machine learning.

Such model may be able to specify which anonymization algorithm may be proposed for which combination of analytic intent and type of data, e.g., the type of data may be specified via its classification, i.e., its business meaning or associated semantics. A model may be constructed via machine learning, e.g. a supervised learning, and are continuously improved based on the knowledge, as to which combinations were used by end users. There are various alternatives considered, each having its properties, as a skilled person will be aware of.

According to one embodiment, the method may include that the model is adapted and/or improved, by machine learning, during its usage. An advantage may be that a future user, after a couple of runs of present users teaching the system, or at least supporting teaching the system, will perceive a very quick and satisfying response that obeys data privacy law.

In one embodiment, this enumeration list can be extended by end users of the system. This may have an advantage that an intent can easily be specified by a user and easily determined by the method.

According to one embodiment, the method may include that a catalog is employed, the catalog comprising business terms, information asset metadata, classification information, a generalization hierarchy, a data privacy governance rule and a corresponding test algorithm, an enumeration specifying the usage scenario.

According to one embodiment, the method may include that an interaction with the user is admitted so that the user may, using machine learning, amend the process of anonymization executed by the method.

According to one embodiment, the method may include suggesting, to the user, a candidate anonymization algorithm. This may have an advantage that the iteration can be executed more interactively and more flexibly, in particular in a situation when the overall algorithm is in a stuck situation.

According to one embodiment, the method may include receiving, from the user, a confirmation on one candidate anonymization algorithm.

According to one embodiment, the method may include applying the confirmed anonymization algorithm on the requested data. Taken together, interactively suggesting a candidate anonymization algorithm and applying it when selected, may accelerate the iterative process of getting a search result with rich data content that obeys data privacy law.

According to an aspect, a computer program product for anonymizing data is suggested.

In an embodiment, the computer program may include a computer readable storage medium having computer usable code embodied therewith, wherein the computer readable storage medium is not a transitory signal per se, the computer usable program code comprising several components as described below, the advantages and explanations as already given above.

In an embodiment, the computer usable program code may include computer usable code configured for receiving, e.g. from an application, a request for data, the request comprising at least one field descriptor, e.g. a column name, of data to be retrieved and a usage scenario, that may include an intent, of a user for the requested data.

In an embodiment, the computer usable program code may include computer usable code configured for determining, based on the usage scenario, and, possibly, the protection level, an anonymization algorithm to be applied to the data, or each of the data, that is referred to by the field descriptor.

In an embodiment, the computer usable program code may include computer usable code configured for applying the determined anonymization algorithm to the data that is referred to by the field descriptor, wherein it is to be understood that the anonymization will not be applied to the original data, it will merely be applied to a copy of the data.

In an embodiment, the computer usable program code may include computer usable code configured for testing, whether the degree of anonymization fulfills a requirement that is related to the usage scenario.

In an embodiment, the computer usable program code may include computer usable code configured for, in the case, the requirement is fulfilled, providing access to the anonymized data.

According to an aspect, a system for anonymizing data is suggested, the system comprising features, the advantages and explanations as already given above.

In an embodiment, the system may include a communication component configured to communicate with a user;

In an embodiment, the system may include an anonymization engine, communicatively coupled to the communication component, the anonymization engine comprising In an embodiment, the system may include a means for receiving a request for data, the request comprising at least one field descriptor or column name of data to be retrieved and a usage scenario or intent of a user for the requested data.

The skilled person will understand that a means can be any component carrying computer usable program code or even computer usable program code with a processor.

In an embodiment, the system may include a means for determining, based on the usage scenario and/or the protection level, an anonymization algorithm to be applied to the data, or each of the data, that is referred to by the field descriptor;

In an embodiment, the system may include a means for applying the determined anonymization algorithm to the data that is referred to by the field descriptor, e.g., the anonymization may not be applied to the original data, however it will be applied to a copy of the data.

In an embodiment, the system may include a means for testing, whether the degree of anonymization fulfills a requirement that is related to the usage scenario.

In an embodiment, the system may include a means for, in the case, the requirement is fulfilled, providing access to the anonymized data.

To summarize, the present invention may aim at extending a scope of lawful analytics that can be performed against the available data. The method, computer program product and system described herein propose an anonymization of data that takes the analytic intent of users, the semantic classification of data, as well as existing data privacy governance rules into account. The proposals may be improved over time through, e.g., machine learning. Explicit feedback from users through interactive proposal changes as well as implicit feedback through accepting proposals may be taken into account to improve an underlying analytics model.

In other words, one base idea is to implement a system and method that allows analytics users to specify their analytic intent. Every time the analytic user is accessing data a "Minimum Anonymization Advisor" checks whether this data has to be anonymized in which case the advisor proposes an anonymization that has proven useful in the past for such an analytic intent and for similarly classified data. In an interactive process the analytics user can influence the anonymization and tune it, so that the anonymization better fits to the analytic intent without violating privacy governance rules. This feedback is used to improve the proposals over time. The system, method and computer program product are described in more detail in the next section.

The inventions aims at achieving several benefits, as for, e.g., the key benefits of this invention are, amongst others: A high likeliness that a proposed anonymization fits to the needs of the analysis a user wants to perform. The proposals will improve over time. This allows to offer such a system to self-service users who are not anonymization experts. Expert users can interactively and successively adapt non fitting anonymization proposals to their needs, if possible. The expert user has full control over anonymization
    within the limits of what is lawful. The system always
      enforces sufficient anonymization and this can be
      proven to auditors.

In other words, the above disclosure aims at extending the scope of lawful analytics that can be performed against the available data. The suggested method includes proposing an anonymization of data that may use the analytic intent of users, the semantic classification of data, as well as existing data privacy governance rules into account. The proposals may improve over time through machine learning. Explicit feedback from users through interactive proposal changes as well as implicit feedback through accepting proposals may be taken into account to improve the underlying analytics model.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A block diagram illustrating an example computer processing system adapted to implement the methods of the present invention is shown in FIG. 1. The computer system, generally referenced 1, includes a processor 2 which may include a digital signal processor (DSP), central processing unit (CPU), microcontroller, microprocessor, microcomputer, ASIC or FPGA core. The system also includes static read only memory 7 and dynamic main memory 6 and may also include a FLASH memory 5. The processor 2 is via a bus 3 in communication with any of said memory devices as well as with peripheral devices such as a display device 10, a keyboard 9, a pointing device 8, such as, e.g., a mouse or a tablet.

The computer system is connected to one or more external networks such as a LAN or WAN or SAN 12 via communications lines connected to the system via one or more data I/O communication interfaces 11, e.g. a network interface 11. The network adapters 11 coupled to the system enable the data processing system to become coupled to other data processing systems or remote printers or storage devices through intervening public or private networks. Modem, cable modem and Ethernet cards are just a few of the currently available types of network adapters. The system includes also a magnetic or semiconductor based data storage or storage device 4 and/or 13 for storing application programs and data. The system includes computer readable storage medium that may include any suitable memory means, including but not limited to, magnetic storage, optical storage, semiconductor volatile or non-volatile memory or any other memory storage device.

In an exemplary embodiment it is envisaged that the computer system that the user uses to communicate with the computer system that executes the method of present invention is a client computer system as depicted above. In another exemplary embodiment it is envisaged that the computer system that executes the method of present invention essentially is structured comparable, however, in detail, is structured as illustrated below.

Figure 3:
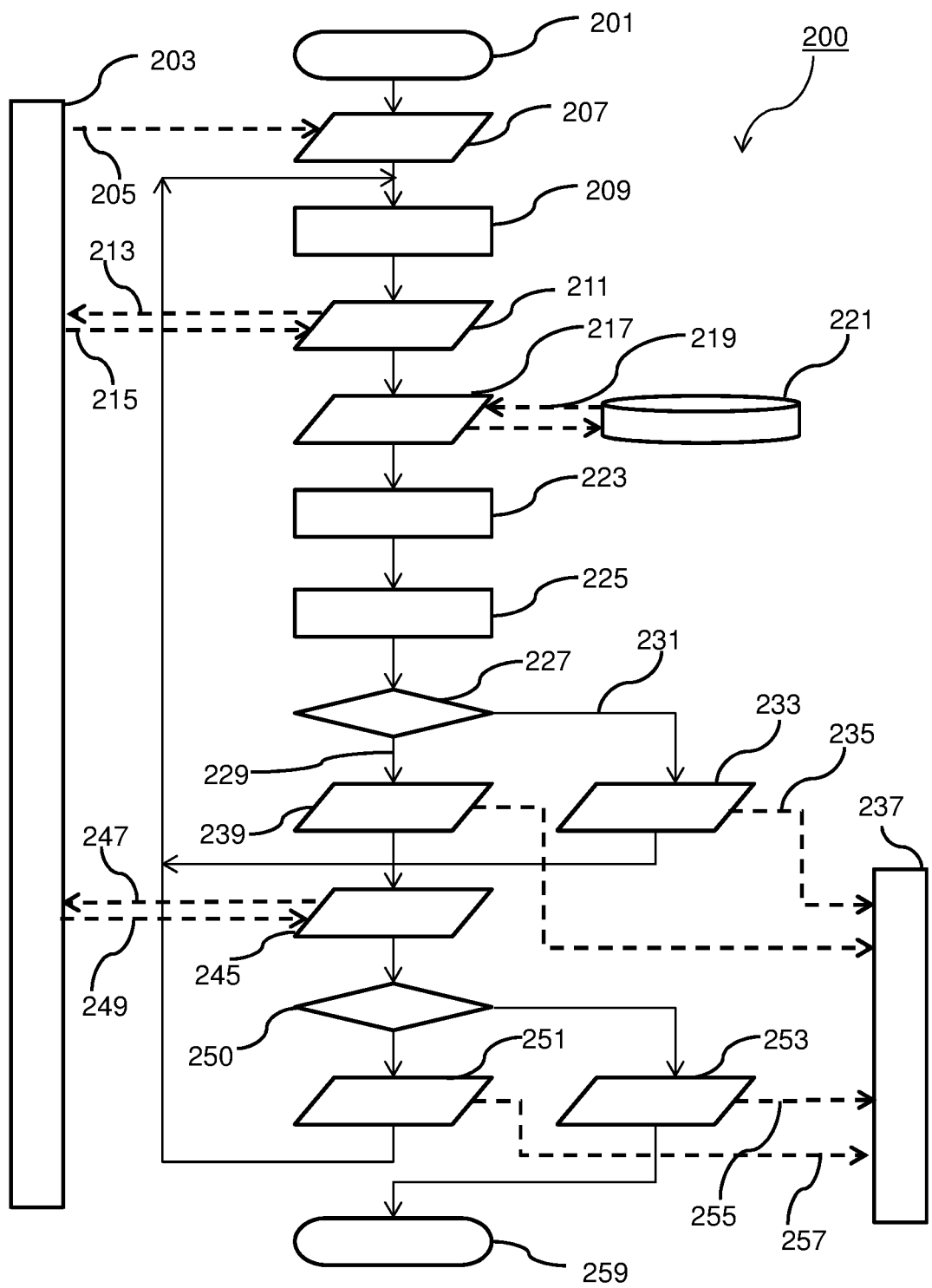
FIG. 3 illustrates a flow chart of the method set forth herein.

In the following figures, the system architecture is described. Using this system architecture as background and performing the method as depicted in FIG. 3, using the example tables from FIGS. 4 and 5 and the example content for the catalog listed below, in the following, a method will be disclosed that helps a data scientist to find a suitable anonymization for the kind of analytics he or she wants to perform.

Figure 2:
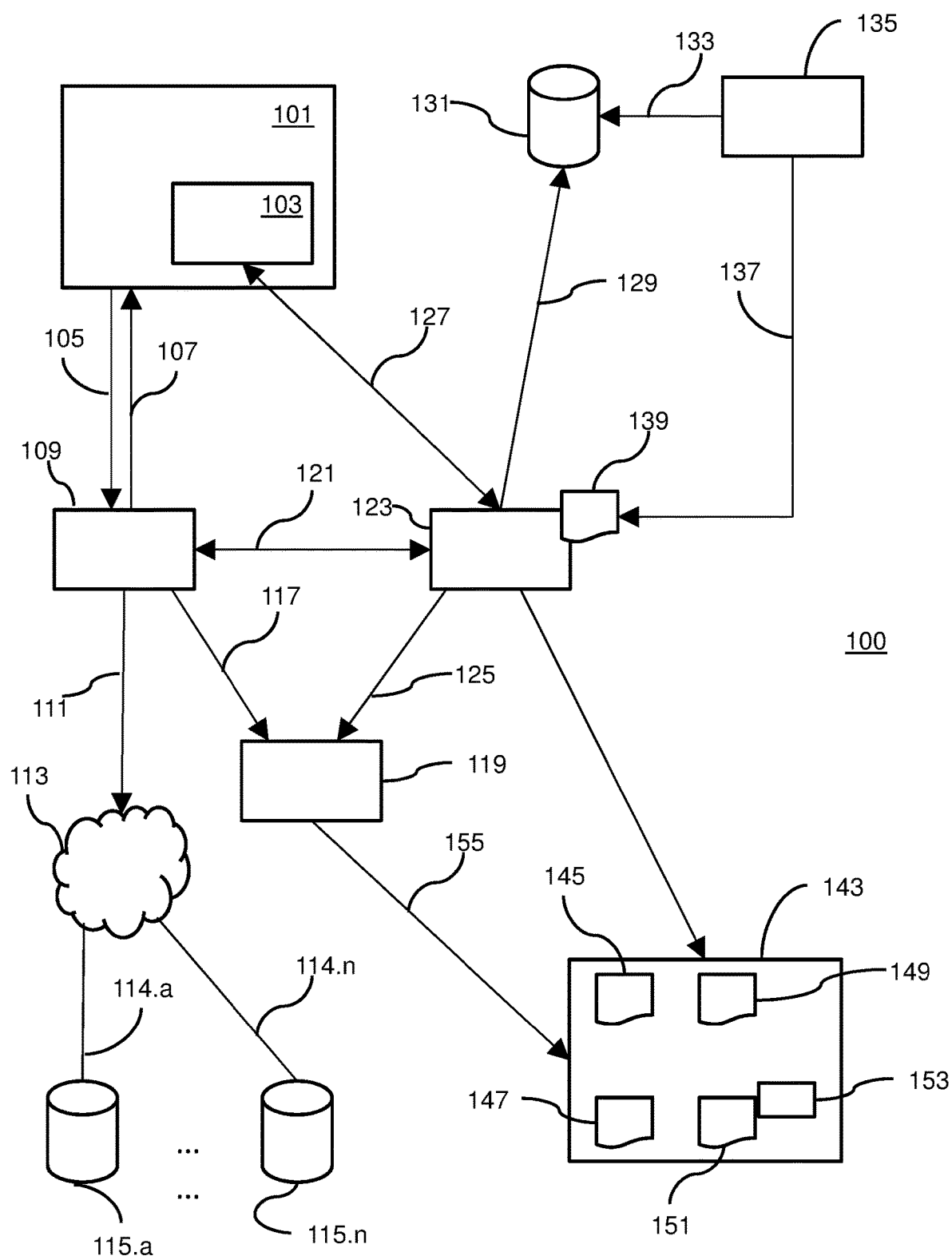
FIG. 2 illustrates an architecture of cooperating components.

FIG. 2 is an illustration of an architecture 100 of cooperating components that may be used to implement the method described herein. Numeral 101 depicts a data scientist application that is provided with an anonymization advisor 103. The anonymization advisor is arranged to communicate via 127, performing an interactive adaptation of anonymization proposal, with an anonymization manager 123.

The user, operating the data scientist application, e.g., via a user interface, may cause a request of data being issued via 105 towards a connector 109. When every of the steps described below are finished, the connector 109 may return, 107, the anonymized data. The connector 109 may request un-anonymized data via 111 from a data lake 113 having un-anonymized data sets. It is considered that the data lake 113 might be coupled, via 114.a, . . . , 114.n, to un-anonymized databases 115.a, . . . , 115.n.

The connector may be in communication, 121, with the anonymization manager, in order to check anonymization needs. Both the connector 109, via 117, and the anonymization manager 123, via 125, may use anonymization services 119. The anonymization services 119 may retrieve, via 155, from a catalog 143, metadata relevant for applying anonymization.

The catalog 143 may include data collections of classification metadata 145, analytic intent 149, generalization hierarchy 147, privacy rules 151 and associated privacy rule test 153. The skilled person is aware that data collections may be stored and organized as lists, tables, and that the data stored therein may include dates, strings, chars, pointers to function, and more.

The anonymization manager 123 may be equipped with an anonymization model 139, assists or controls the core work of the anonymization manager.

The anonymization manager 123 may be further in communication, 129, with an anonymization knowledge base 131, in order to collect information about anonymization usage. The anonymization database 131 may be in communication, 133, with a model training component 135, may be arranged to create or amend, 137, the anonymization model.

FIG. 3 illustrates a flow chart of a method 200 set forth herein describing several embodiments. The method 200 starts initially in 201. A user, not shown, may communicate via a user interface and use a data scientist application 203. Via line 205, the application may initiate a session at 207. In the present figure, input-output actions are specified via a symbol matching in shape to symbol 207, as usual, and the input-output is depicted as a dashed line, in order to keep some comprehensibility.

In other words, the method may receive, via 205, in 207, the request for data. The request for data may include at least one field descriptor or column name of data to be retrieved and a usage scenario or intent of the user for the requested data.

In 209, an anonymization algorithm may be determined, based on the usage scenario, the anonymization algorithm to be applied to the data that is referred to by the field descriptor. In embodiments, it may be envisaged to request a multiplicity of data columns. In 211, the user may be prompted, via 213, as to whether he accepts the determined anonymization algorithm or anonymization algorithms in the case there are more columns requested. Upon replying, by the user, via 215, the method may continue at 217.

In 217, a data lake 221 might be contacted, via exchange 219, in order to delivery un-anonymized data towards the method, which might be implemented as copying the requested data from the data lake 221 towards a memory of system 100, shown, in another view, as computer system 1, e.g., towards RAM 6 or data storage 4.

The method continues in 223 and may apply the anonymization algorithms that might have been agreed upon in 211, 213, 215. In particular, it is considered that the determined anonymization algorithm may be applied to the data that is referred to by the field descriptor. Subsequently, in 225, it may be tested, as to whether the degree of anonymization fulfills a requirement that is related to the usage scenario. The skilled person understands that the requirement is to be understood as a requirement concerning a degree of anonymity.

In decision caret 227, in the case the required anonymity is reached or fulfilled, i.e., data privacy law is obeyed to, the method may continue via 229 at 239. Input output module 239 may inform the anonymization knowledge base 131 and 237 about reaching the required anonymity, so that machine learning of the anonymization model 139 may be supported.

In the case, the required anonymity is not reached, the method may continue via 231 towards another input output module 233, informing, via 235, the anonymization knowledge base 237 about this situation, so that machine learning is supported. In this case, as the anonymity requirement is not fulfilled, the method will restart at 209 and inform the user, in order to employ a different anonymization strategy.

When the required anonymity grade was reached, the method may continue at 245, prompting the user the result, via 247, and asking, whether the data is sufficient for him to continue his work.

In the case, as to whether the data is sufficient, this may be transmitted, via 249, towards input output module 245.

In decision caret 250, a branching of the method may be controlled, dependent on whether the data was sufficient for evaluation, or was anonymized to a too high degree.

If the data is considered as sufficient, the method may continue at 253, using this feedback, via 255, as a further learning feedback towards anonymization knowledge base 237. Then, the execution of the method may finish at 259.

In the case, the data is considered to be not sufficient, the method may continue at 251, using this feedback, via 257, as a further learning feedback towards anonymization knowledge base 237. The, the execution of the method may continue at 209.

The skilled person is well aware of the possibility, that the learning feedback may be made dependent on the role of the user. For example, in the case an experienced data scientist issues the request, the feedback learning might be switched on or receive a higher weight, whereas, in the case an unexperienced user issues the request, feedback learning might be switched off or receive a lower learning weight.

FIG. 4 exemplarily illustrates a table to be anonymized. The column "Name" may be, by a classification part of a catalog, classified to be, in business terms, a "Full Name" 301. The business term 301 of "Full Name" may be used as an identifier 315, able to identify a person.

The column "Date" may be, by a classification part of the catalog, classified to be, in business terms, a "Date of Birth", 305. The business term 305 of "Date of Birth" is not able to serve as an identifier, but might be used as a quasi-identifier 317, when combined with other data associated with that person.

The column "Sex" may be classified to be associated with the business term "Gender", 307, that may also be only a quasi-identifier 319. The column "Nationality" may be associated with the business term 309, "Nationality", and quasi-identifier 321. The column "Address" may be associated with the business term ZIP-code, 311, that may also be only a quasi-identifier 323, and, the column "Disease" may be classified to be associated with the business term "Disease", 313, that may be classified to be sensitive data Thus, mere data column names or headers are provided, via the concept of business terms, with semantics, that may be adequately processed in the further components of the system.

Figure 5:
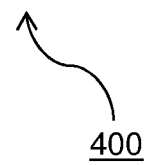
FIG. 5 shows, exemplarily, an anonymization of the table to be anonymized.

FIG. 5 shows, exemplarily, an anonymization of the table of FIG. 4 that was to be anonymized.

As can be seen, the column "Name" is completely omitted. The column "Date" with the semantics of "Date of Birth" is amended to produce only interval related information. The column "Nationality" is transformed into enumerated values. The address is aggregated or generalized to include the name of the city, the ZIP code belongs to, and the disease is also generalized.

As a result, it is not possible to uniquely identify any person.

In an embodiment, the aforementioned method may be described as follows:

It may be assumed that the catalog may include the following information:

Definitions for business terms such as "Full Name", "Date of Birth", "Gender", "Nationality", "ZIP", "Disease" including a definition that "Full Name" is an Identifier, "Disease" is sensitive data, and the other terms listed above are quasiidentifier.

The catalog may store metadata about the table study_results including technical metadata about the columns in this table.

The catalog may store classification information, specifically that column Name contains "Full Name" values, column Date is "Date of Birth", Sex is "Gender", Nationality is "Nationality", Address is "ZIP", and Disease is "Disease". Such information may typically be specified by a curator at the time the table is registered in the catalog.

The catalog may store information that Hepatitis A and Hepatitis B can be generalized to Hepatitis and Asian Flu and Russian Flu can be generalized to Flu. It also may know that 72070, 72072, 72074 are zip numbers for the city Tuebingen and 70173 and 70176 are zip numbers for the city Stuttgart. It also may know that a concrete "Date of Birth" can be generalized by reducing it to a year and further generalized by building intervals of years.

The catalog may have a privacy governance rule "2-anonymity for sensitive data" that specifies that a data scientist can only see data from a table with sensitive information if this table is at least 2-anonymized. A table is k-anonymized if for each record representing an individual there are at least additional k−1 individuals whose information also appear in the table and the data is not distinguishable, i.e. the governance rule above demands at least one duplicate per individual with respect to columns that can be used to identify individuals.

Furthermore the catalog may know all different "analytic intent" values, in this case {"medical study evaluation", "customer churn analysis", "fraud detection"}.

Furthermore, it may be assumed that the system may support the following list of "Anonymization Services": Generalization, Redaction, Masking_by_sequential_function and that the system has been trained with data leading to a recommendation model that in case of the analytic intent being "medical study evaluation" proposes to use "Redaction" for data classified as "Full Name", Generalization for "Birth of Date", "Address", "ZIP" and "Disease" and "Masking by sequential function" for "Nationality".

These are the steps being performed when a data scientist requests data from a data lake to perform a "medical study evaluation". In the present example case, the data scientist may request the data for table STUDY_RESULTS.

The invention claimed is:

1. A computer program product for anonymizing data, the computer program comprising:
   a non-transitory computer readable storage medium having computer usable code embodied therewith, the computer usable program code comprising:
   computer usable code configured for receiving a request for data, the request comprising at least one field descriptor of data to be retrieved and a usage scenario of a user for the requested data;
   computer usable code configured for determining, based on the usage scenario an anonymization algorithm to be applied to the data that is referred to by the field descriptor;
   computer usable code configured for applying the anonymization algorithm to the data that is referred to by the field descriptor;
   computer usable code configured for testing, whether a degree of anonymization fulfills a requirement that is related to the usage scenario;
   computer usable code configured for, based on a determination that the requirement is fulfilled, providing access to the anonymized data, wherein the usage scenario comprises an intent of the user requesting the data and a role of the user.

2. The computer program product of claim 1, wherein at least one protection level is associated with the field descriptor.

3. The computer program product of claim 2, wherein the anonymization algorithm to be applied is selected based on the usage scenario and the protection level.

4. The computer program product of claim 1, wherein the anonymization algorithm is at least one of the following: generalization, redaction, suppressing, sampling, randomization, data swapping, masking, enumeration.

5. The computer program product of claim 1, wherein the computer usable program code further comprises computer usable code configured for receiving a feedback from a user, the feedback forming a support of machine learning.

6. The computer program product of claim 1, wherein the requirement that is related to the usage scenario is k-anonymity.

7. The computer program product of claim 1, wherein the data is related to information asset metadata that comprises an availability of data tables to the user and the field descriptors these data tables have.

8. The computer program product of claim 1, wherein business terms are provided, forming keywords to be used by the user, wherein classification information is provided, representing relationships between business terms and information asset metadata.

9. The computer program product of claim 1, wherein generalization hierarchies are provided for enabling a generalization algorithm to execute.

10. The computer program product of claim 1, wherein a data privacy governance rule and a corresponding test algorithm for the testing, is specified, for controlling the method to be executed until, based on the data to be retrieved and the usage scenario, the retrieved data after anonymization corresponds to the degree of anonymization.

11. The computer program product of claim 1, wherein a model is provided, the model specifying a relationship between an anonymization algorithm, a usage scenario, and a classification of the data.

12. The computer program product of claim 11, wherein the model is built up by machine learning.

13. The computer program product of claim 12, wherein the model is adapted, by machine learning, during its usage.

14. The computer program product of claim 1, wherein an enumeration for a specification of the usage scenario is provided.

15. The computer program product of claim 14, wherein the enumeration may specify, at least one of medical study evaluation, customer churn analysis, fraud detection.

16. The computer program product of claim 1, wherein the computer usable program code further comprises a catalog comprising business terms, information asset metadata, classification information, a generalization hierarchy, a data privacy governance rule and a corresponding test algorithm, an enumeration specifying the usage scenario.

17. The computer program product of claim 1, wherein an interaction with the user is admitted so that the user may, using machine learning, amend the method of anonymization.

18. A system for anonymizing data, the system comprising:
   a communication component embodied at least partially in hardware and configured to communicate with a user;
   a processor, communicatively coupled to the communication component, the processor comprising:

a means for receiving a request for data, the request comprising at least one field descriptor of data to be retrieved and a usage scenario of a user for the requested data;

a means for determining, based on the usage scenario, an anonymization algorithm to be applied to the data that is referred to by the field descriptor;

a means for applying the determined anonymization algorithm to the data that is referred to by the field descriptor;

a means for testing, whether a degree of anonymization fulfills a requirement that is related to the usage scenario;

a means for, providing access to the anonymized data based on a determination that the requirement is fulfilled, wherein the usage scenario comprises an intent of the user requesting the data and a role of the user.

* * * * *